(12) United States Patent
Seger et al.

(10) Patent No.: US 9,517,734 B2
(45) Date of Patent: Dec. 13, 2016

(54) CAMERA FOR A VEHICLE AND VEHICLE HAVING THE CAMERA

(71) Applicant: Robert Bosch GmbH, Stuttgart (DE)

(72) Inventors: Ulrich Seger, Leonberg-Warmbronn (DE); Nikolai Bauer, Moeglingen (DE); Christian Hoellt, Schoeneck (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/227,716

(22) Filed: Mar. 27, 2014

(65) Prior Publication Data

US 2014/0362219 A1    Dec. 11, 2014

(51) Int. Cl.
| | |
|---|---|
| *G03B 17/02* | (2006.01) |
| *B60R 11/04* | (2006.01) |
| *G02B 17/08* | (2006.01) |
| *G02B 27/01* | (2006.01) |
| *G03B 29/00* | (2006.01) |
| *B60R 11/00* | (2006.01) |

(52) U.S. Cl.
CPC ............. *B60R 11/04* (2013.01); *G02B 17/086* (2013.01); *G02B 27/0101* (2013.01); *G03B 29/00* (2013.01); *B60R 2011/0026* (2013.01); *B60R 2300/10* (2013.01); *G02B 2027/0138* (2013.01)

(58) Field of Classification Search
USPC ........ 396/419, 535; 348/143, 148, 373–376; 359/207.8, 366
See application file for complete search history.

(56) References Cited

U.S. PATENT DOCUMENTS

| | | | | |
|---|---|---|---|---|
| 7,170,558 | B2* | 1/2007 | Yokota | H04N 5/2254 348/337 |
| 2006/0257129 | A1* | 11/2006 | Shibatani | G02B 27/646 396/55 |
| 2011/0090389 | A1* | 4/2011 | Saito | 348/333.01 |
| 2011/0141279 | A1* | 6/2011 | Cheng | 348/143 |
| 2012/0274770 | A1* | 11/2012 | Lee | G07C 5/0866 348/148 |
| 2013/0050489 | A1* | 2/2013 | Taylor et al. | 348/148 |
| 2013/0162827 | A1* | 6/2013 | Eickhoff et al. | 348/148 |
| 2015/0070499 | A1* | 3/2015 | Roelke et al. | 348/148 |

OTHER PUBLICATIONS

"Assistenten hinter Glas" ["Assistants Behind Glass"], Automobil-Elektronik [Automotive Electronics], August, 2008, pgs. 18-20.

* cited by examiner

*Primary Examiner* — Minh Phan
(74) *Attorney, Agent, or Firm* — Norton Rose Fulbright US LLP; Gerard Messina

(57) ABSTRACT

A camera for a vehicle, the camera including: an image sensor; and a camera lens system for imaging a coverage region on the image sensor; the camera lens system having at least one lens; and the camera lens system and the image sensor determining an optical axis of the camera. In this connection, The camera lens system further includes a nonplanar reflector element which deflects the optical axis of the camera.

2 Claims, 2 Drawing Sheets

CAMERA FOR A VEHICLE AND VEHICLE HAVING THE CAMERA

CROSS REFERENCE

The present application claims the benefit of 35 U.S.C. §119 of German Patent Application No. DE 10 2013 205 414.9 filed on Mar. 27, 2013, which is expressly incorporated herein by reference in its entirety.

BACKGROUND INFORMATION

Cameras in vehicles are used both for representation on a display and in driver assistance systems. In this connection, front cameras monitor the road surface region in front of the vehicle from the interior of the vehicle; accordingly, their optical axis determined by the camera lens system and sensor is oriented substantially parallel to the longitudinal axis of the vehicle.

Therefore, the optical path runs from the external coverage region to be imaged, through an optical transit surface of the vehicle window and the camera lens system, to the image sensor. The size of the optical transit surface of the vehicle window is a function of, first of all, the aperture angle of the camera lens system, and secondly, the inclination of the vehicle window with respect to the optical axis; if the window is more inclined or formed to have a flat profile, or the aperture angle is larger, then the optical transit surface becomes correspondingly larger, as well.

However, the available region of the vehicle window required for the optical transit surface is generally limited. In addition to a vehicle camera, further modules may have to be installed, such as a rain sensor, light sensor and, e.g., a mirror support for mounting a rearview mirror in this region. Installed visors, black printing in the upper region of the window for attenuating incident sunlight, and baffles, further reduce the encumbered view through the windshield. Thus, the demand for cameras having a large aperture angle for being able to substantially monitor the scene of the roadway in front of and, if indicated, in the vehicle, conflicts with the limited, available region of the windshield, in particular, in the upper region of the windshield of the vehicle.

In order to be able to provide a large aperture angle of the camera when the optical transit surface is limited, it is suggested, in "Assistenten hinter Glas" ["Assistants Behind Glass"], Automobil-Elektronik [Automotive Electronics], August, 2008, that one or more prisms should be introduced into the optical path between the glass and the camera lens system. The expansion of the optical path may be reduced by such a prism. However, by this means, the reduction in the optical entry surface is limited, based on principle. More intense distortion may occur, which, in the case of the generally discrete-sampling image sensor, may cause significant information losses in some image regions. Furthermore, the optical design of the prism must be adapted to varying window inclination in the respective vehicle, in particular, when a substantially constant line of sight to the front is supposed to be achieved.

SUMMARY

According to the present invention, in addition to the at least one refracting element, the camera lens system has at least one nonplanar reflector element, which deflects the optical axis of the camera. In this connection, "deflecting the optical axis" is preferably understood to mean that the optical axis runs through the reflector element and is correspondingly folded or reflected.

Consequently, the optical axis is subdivided by the reflector element into (at least) two partial axes, which preferably meet in the reflector element at an angle not equal to 180°. In principle, additional reflector elements may also be provided; however, they are generally not required.

Thus, preferably, the reflector element is also not only provided in an edge region outside of the optical axis, in order to provide additional information from another coverage angle, as is conventional to be partially the case with additional sensor systems; on the contrary, the reflector element changes the path of the optical axis. In addition, the reflector element acts to form an image, that is, it is nonplanar. It advantageously takes the form of a concave mirror or spherical concave mirror, that is, it has a focusing effect.

Therefore, the at least one reflector element that folds the optical axis and has a focusing effect allows a converging beam of light to be produced from the reflector element, forwards, to the window. In this connection, a beam waist is preferably formed in the optical path, in front of the camera lens system, in particular, between the camera lens system and the vehicle window, or also inside the vehicle window.

A "beam waist" is understood to be a marked narrowing of the optical path, preferably, a generally point-shaped region, e.g., an inversion point.

Some advantages that are provided by this are:

One advantage is the freedom in designing the mounting position of the camera, in particular, of the image sensor and of a primary lens system of the camera that includes the at least one refracting element. The deflection or folding by the reflector element allows this position and orientation to be selected independently of the axis of travel. Thus, a large part of the camera may also be positioned, e.g., substantially parallel to the vehicle window and/or near the vehicle window without constructing the camera lens system to be too small. Consequently, good imaging characteristics may be achieved without taking up too much room in problematic regions of the construction space.

In addition, in the case of different types of vehicles, the camera may be adapted to the construction space situation or situation of the window transit surface; in principle, only the orientation of the reflector element has to be considered.

In this connection, the reflector element may be fixed with respect to the camera housing, or may also be adjustable, in order to be able to produce a suitable design here, as a function of mounting position.

One particular advantage is the option of keeping the window transit surface small, even in the case of a large aperture angle of the camera lens system. Since, starting from the camera lens system, the optical path initially converges or decreases in its cross-sectional area and preferably passes through a beam waist, the optical transit surface occupied by the optical path at the vehicle window may also be kept small when a large aperture angle is formed. This is based on the consideration that the optical transit area is generally a function of the aperture angle of the coverage cone or of the cone of rays, which starts out from the camera lens system, as well as a function of the distance of the tip of this cone of rays from the window; since the tip of this cone of rays in the form of an inversion point or beam waist is shifted closer to the vehicle window or is even situated in the vehicle window, the measured optical transit surface of the window may also be kept small when the aperture angle is large.

Therefore, the volume enclosed between the vehicle window and camera lens system by the optical path may be kept small.

First of all, the reflector element may be provided in addition to a primary lens system of one or more refracting elements, preferably, in front of the primary lens system. In this connection, the reflector element may also be held, for example, by a lens support of the primary lens system or may be formed as a part of the lens support, e.g., a reflective region of the lens support.

Secondly, the reflector element may be combined with the refracting element, so that the reflector element is formed as a partial reflective coating of one of the refracting elements; consequently, this refracting element has an input face, an exit face and a reflective surface region, which acts to reflect or to mirror inwards and hereby forms the reflector element. Thus, it is possible to construct a reflector element without any relevant, additional expenditure for equipment. In this connection, e.g., this special refracting element may be formed in a vehicle-specific manner, and further parts of the camera and, possibly, further refracting elements may be standardized.

Therefore, in such an embodiment having a reflective coating or partial reflective coating of a refracting element, the reflective surface may also be protected from tarnish and soiling.

In addition, in all specific embodiments, an additional diaphragm or field diaphragm may be installed at the location of the beam waist, in order to produce a higher level of robustness with regard to interfering light.

BRIEF DESCRIPTION OF THE DRAWINGS

The present invention is explained in further detail below, in light of the figures, on the basis of example embodiments.

DETAILED DESCRIPTION OF EXAMPLE EMBODIMENTS

Figure 1:
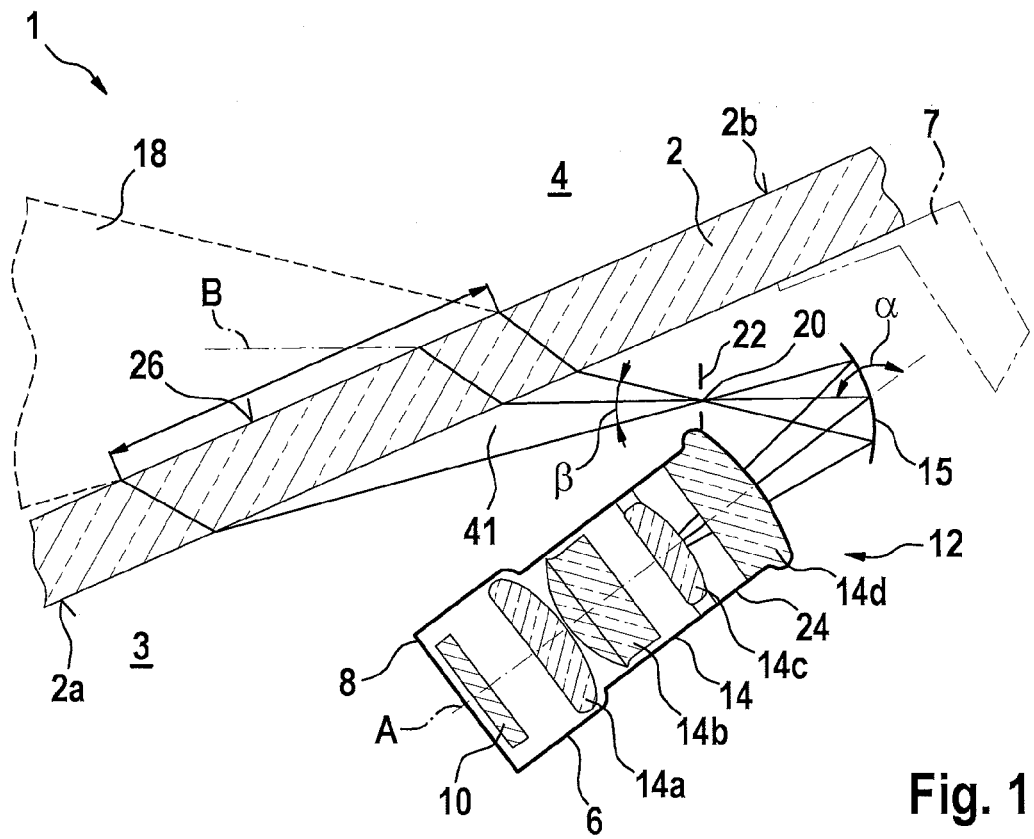
FIG. 1 shows a cross section of the region of a windshield of a vehicle having a camera according to a specific embodiment of the present invention.

A front window (windshield) 2 of a vehicle 1 is illustrated in FIG. 1, the front window separating a vehicle interior 3 from vehicle surroundings 4.

A camera 6 is provided in vehicle interior 3. Camera 6 may be mounted to an inner side 2a of front window 2, or also to the inside roof lining or to a further device, such as the rearview mirror or a visor, using a camera mounting support 7 only indicated here.

Camera 6 has a camera housing 8, in which an image sensor 10 is situated. In addition, camera 6 has a camera lens system 12, which, in this specific embodiment, is formed by a primary lens system 14 and a reflector element 15 provided in front of primary lens system 14. An optical axis A, B of camera 6 is determined by image sensor 10 and camera lens system 12. In a first partial axis A, the optical axis runs perpendicularly and centrically through image sensor 10; in the further course, it corresponds to the axis of symmetry of primary lens system 14, and runs through reflector element 15; in reflector element 15, first partial optical axis A is subsequently deflected onto a second partial optical axis B at a deflection angle α. Thus, partial axes A and B form optical axis A, B of camera 6. Here, deflection angle α is defined as a change in the beam path, that is, it is greater than 0°, that is, there is a deflection, and it is less than 180°, that is, axes A, B are not reflected onto each other. Consequently, the axis of symmetry of reflector element 15 is preferably situated at less than an angle (180°-α)/2 to partial optical axes A and B. Camera 6 monitors a coverage region 18 of vehicle surroundings 4 through windshield 2.

Figure 2:
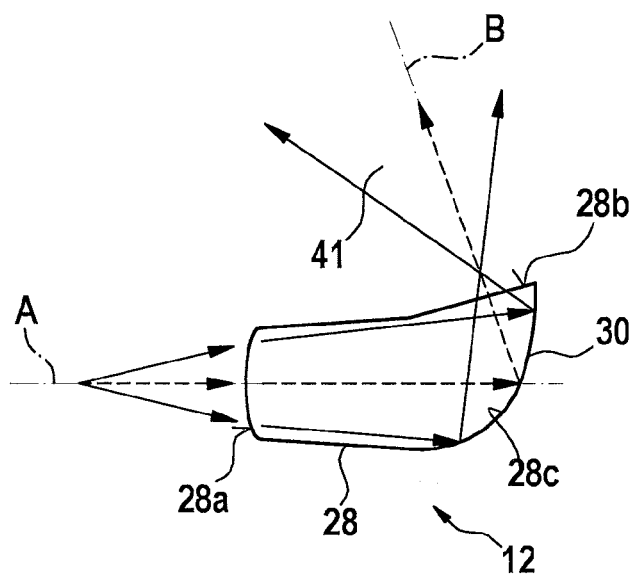
FIG. 2 shows a specific embodiment having a combined construction of the reflector element and a refracting element.

As is apparent, in particular, from FIG. 1 and FIG. 2, optical path 41 converges in a forward direction from reflector element 15 to window 2, the optical path forming a beam waist 20, which, in this case, is situated between reflector element 15 and inner side 2a of the window, but may also lie in window 2. Thus, beam waist 20 also constitutes an inversion point of the optical path. According to FIG. 1, a field diaphragm 22 may be provided, which surrounds beam waist 20 and is used for blocking out extraneous light.

Starting from beam waist 20, optical path 41 expands forwards at an optical aperture angle β and passes through windshield 2, out into vehicle surroundings 4.

In this connection, optical path 41 passes through windshield 2 in an optical transit surface 26. Therefore, the size of optical transit surface 26 is determined by the distance of beam waist 20 from windshield 2, that is, from inner surface 2a and outer surface 2b, by aperture angle β, and by the window inclination, that is, the angle between partial optical axis B and windshield 2a, that is, inner surface 2 and outer surface 2b.

Further regions of inner surface 2a outside of the window transit surface may be blackened to prevent stray light, or may be occupied by other functions.

Primary lens system 14 substantially corresponds to a conventional objective lens and advantageously has a plurality of refracting elements 14a, 14b, 14c, 14d made of, e.g., mineral glass or plastic, which are held in a lens support 24. In this connection, lens support 24 is advantageously attached to camera housing 6, which shields image sensor 10.

In FIG. 1, reflector element 15 forms a secondary lens system and may be connected, e.g., to the lens support, or it may also take the form of a reflective coating in an extension of the lens support, which means that, for example, the lens support and reflector element 15 may be formed as an injection-molded part.

As an alternative to this, reflector element 15 may be mounted directly to camera housing 8, or to a component connected to the camera housing, or also to a camera mounting support 7.

In principle, further optical elements may be provided as part of secondary lens system 15. However, according to the present invention, it has been recognized that a single reflector element 15, in particular, in the form of a concave mirror, is already sufficient for developing the desired imaging characteristics.

In the specific embodiment of FIG. 2, reflector element 30 is combined with a refracting element 28: reflector element 30 is formed as a concave, reflecting surface region 28c of refracting element 28. Consequently, the path of the optical axis is changed or upset inside of refracting element 28: first partial optical axis A runs initially through refracting element 28, is again deflected at reflecting element 30 at an angle α, and subsequently exits refracting element 28 in an output face 28b.

Accordingly, refracting element 28 has a more complex shape, since input face 28a and output face 28b are not, e.g., parallel to one another. Therefore, it is not necessary to design a supporting structure for reflector element 30. Refracting element 28 may be held, in turn, in a common lens support with other refracting elements.

Figure 3:
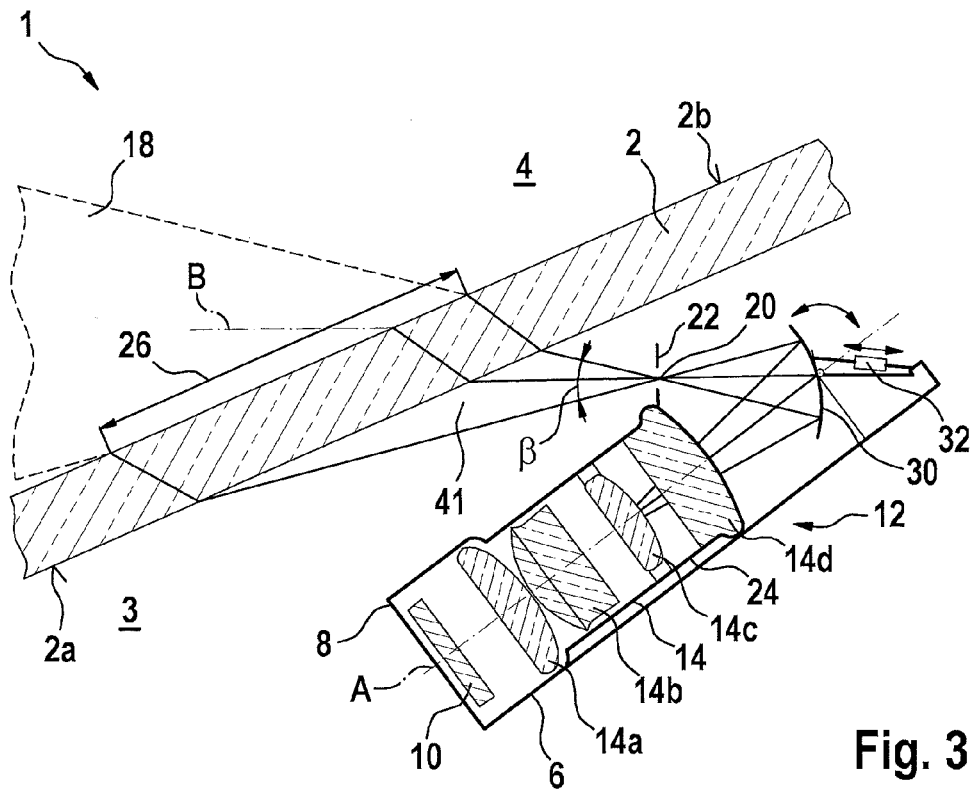
FIG. 3 shows a further specific embodiment having an adjustable reflector element.

In the specific embodiment of FIG. 3, an adjusting device 32 for displacing refracting element 15 is provided, so that angle α between partial optical axes A, B may be adjusted. Consequently, the specific embodiment of FIG. 3 is particularly suitable for adapting camera 6 to different types of vehicles having, in particular, varied inclination of windshield 2 and/or different mounting positions and mounting orientations of camera 6. In order to avoid expensive adjustments, e.g., different adjustment positions may be preselected as locating stops for different types.

Figure 4:
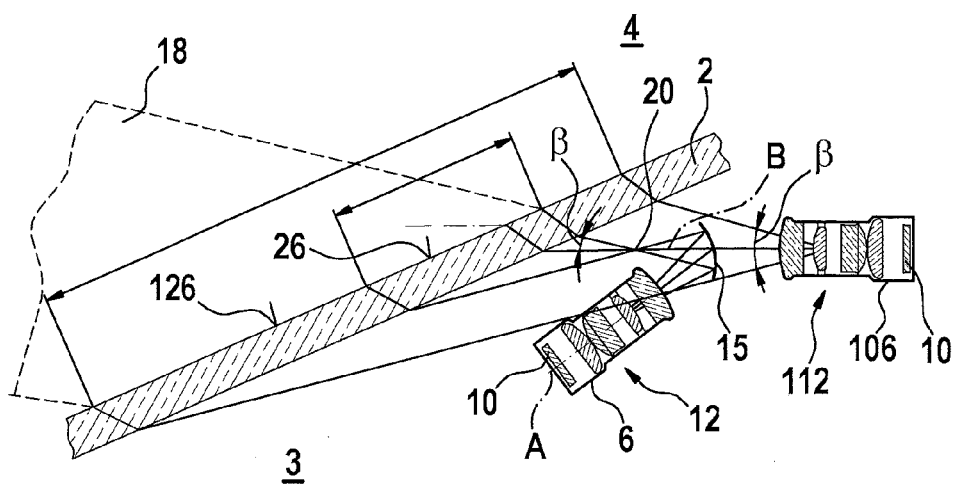
FIG. 4 shows a comparison of the camera lens of the specific embodiment of the present invention having reflector element to a conventional camera without a reflector element.

FIG. 4 shows, in a highly schematic manner, a comparison of camera 6 according to the specific embodiment of the present invention, including the camera lens system 12 having reflector element 15, to a conventional camera 106 which has a camera lens system 112 and is aimed at a coverage region 18 in vehicle surroundings 4 without a reflector element. At the same aperture angle β and the same optical distance of image sensor 10 from windshield 2 or from a transit point of optical axis B through windshield 2, the present invention produces a smaller optical transit surface 26.

Therefore, by using reflector element 15, a small optical transit surface 26 may be obtained with a large optical distance, large aperture angle β and, consequently, good imaging characteristics. Furthermore, the position and orientation of the camera, in particular, primary lens system 14, is substantially decoupled from the position and inclination of the windshield and installation locations of the camera; an adjustment may be made, using reflector element 15.

What is claimed is:

1. A camera system, comprising:
a camera for positioning inside a vehicle with the aid of a camera mounting support and being provided to image a coverage region situated outside of the vehicle, through a window of the vehicle, the camera including an image sensor, a camera lens system for imaging a coverage region on the image sensor, the camera lens system having at least one lens, the camera lens system and the image sensor determining an optical axis of the camera, and wherein the camera lens system further includes a nonplanar reflector element, which deflects the optical axis of the camera;
wherein a beam waist or an inversion point being formed in the optical path between the camera and the vehicle window or in the vehicle window, wherein the optical axis of the camera is subdivided by the reflector element of the camera into a first and second partial axes situated at an angle not equal to 180°, of which the second partial axis runs through the windshield, the beam waist being formed in the second partial axis.

2. The camera system as recited in claim 1, wherein the window is a windshield of the vehicle.

* * * * *